United States Patent
Watanabe

(10) Patent No.: US 9,862,091 B2
(45) Date of Patent: Jan. 9, 2018

(54) INFORMATION PROCESSING APPARATUS AND INFORMATION PROCESSING METHOD

(71) Applicant: CANON KABUSHIKI KAISHA, Tokyo (JP)

(72) Inventor: Daisuke Watanabe, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 95 days.

(21) Appl. No.: 14/519,410

(22) Filed: Oct. 21, 2014

(65) Prior Publication Data
US 2015/0120054 A1    Apr. 30, 2015

(30) Foreign Application Priority Data
Oct. 31, 2013 (JP) .................. 2013-227537

(51) Int. Cl.
B25J 9/16    (2006.01)

(52) U.S. Cl.
CPC .......... B25J 9/1612 (2013.01); B25J 9/1697 (2013.01); G05B 2219/37555 (2013.01);
(Continued)

(58) Field of Classification Search
CPC ..... B23P 19/007; B65G 47/905; B65G 61/00; B25J 9/16; B25J 9/1602; B25J 9/1628;
(Continued)

(56) References Cited

U.S. PATENT DOCUMENTS 4,909,376 A * 3/1990 Herndon ................ B25J 9/1697
                                                                   198/395
7,177,459 B1    2/2007 Watanabe et al.
(Continued)

FOREIGN PATENT DOCUMENTS

CN    103213124 A    7/2013
CN    103223674 A    7/2013
(Continued)

OTHER PUBLICATIONS

Mar. 19, 2015 extended European Search Report concerning corresponding European Patent Application No. 14191124.8.
(Continued)

*Primary Examiner* — Adam R Mott
(74) *Attorney, Agent, or Firm* — Fitzpatrick, Cella, Harper & Scinto

(57) ABSTRACT

An orientation designated in advance as an orientation that a grip unit is to take to grip an object having a shape of rotational symmetry with respect to at least one axis is acquired as a reference orientation. The relative position and orientation of the object and grip unit when the grip unit grips the object is acquired as a taught position and orientation. The position and orientation of the object is recognized from an image, and an initial position and initial orientation in which the grip unit grips the object are derived based on the recognized and taught positions and orientations. A grip orientation to grip the object is decided based on the reference and the initial orientation, and a grip position and orientation in which the grip unit grips the object is decided based on the grip orientation and the initial position.

14 Claims, 9 Drawing Sheets

(52) U.S. Cl.
CPC .............. *G05B 2219/39476* (2013.01); *G05B 2219/39487* (2013.01); *G05B 2219/40053* (2013.01)

(58) Field of Classification Search
CPC ........ B25J 9/163; B25J 9/1687; B25J 9/1612; B25J 9/1697; B25J 9/1664; B25J 9/1671; G05B 2219/3755; G05B 2219/39527; G05B 2219/39473; G05B 2219/39476; G05B 2219/39543; G05B 2219/40564; G05B 2219/40053; G05B 2219/39487; G05B 2219/40583
See application file for complete search history.

(56) References Cited

U.S. PATENT DOCUMENTS

| | | |
|---|---|---|
| 8,792,726 B2 | 7/2014 | Watanabe et al. |
| 9,050,722 B2 | 6/2015 | Satou |
| 9,302,395 B2 | 4/2016 | Ando et al. |
| 9,358,686 B2 | 6/2016 | Kimura |
| 2004/0186624 A1* | 9/2004 | Oda ................ B25J 9/1697 700/245 |
| 2012/0262455 A1 | 10/2012 | Watanabe et al. |
| 2013/0209209 A1 | 8/2013 | Fukudome et al. |
| 2014/0067126 A1 | 3/2014 | Watanabe et al. |

FOREIGN PATENT DOCUMENTS

| | | |
|---|---|---|
| CN | 103240744 A | 8/2013 |
| JP | 2000-288974 A | 10/2000 |
| JP | 2006-130580 A | 5/2006 |
| JP | 2009-056513 A | 3/2009 |
| JP | 2012-183593 A | 9/2012 |
| JP | 2013-056393 A | 3/2013 |
| JP | 2014-054715 A | 3/2014 |

OTHER PUBLICATIONS

Donna C. Dupuis, "Two-Fingered Grasp Planning for Randomized Bin-Picking: Determining the Best Pick", Aug. 2009, pp. 1-58, The University of British Columbia, Vancouver.

Dec. 1, 2016 Chinese Office Action corresponding to Chinese Patent Application No. 201410592050.3.

* cited by examiner

FIG. 5A
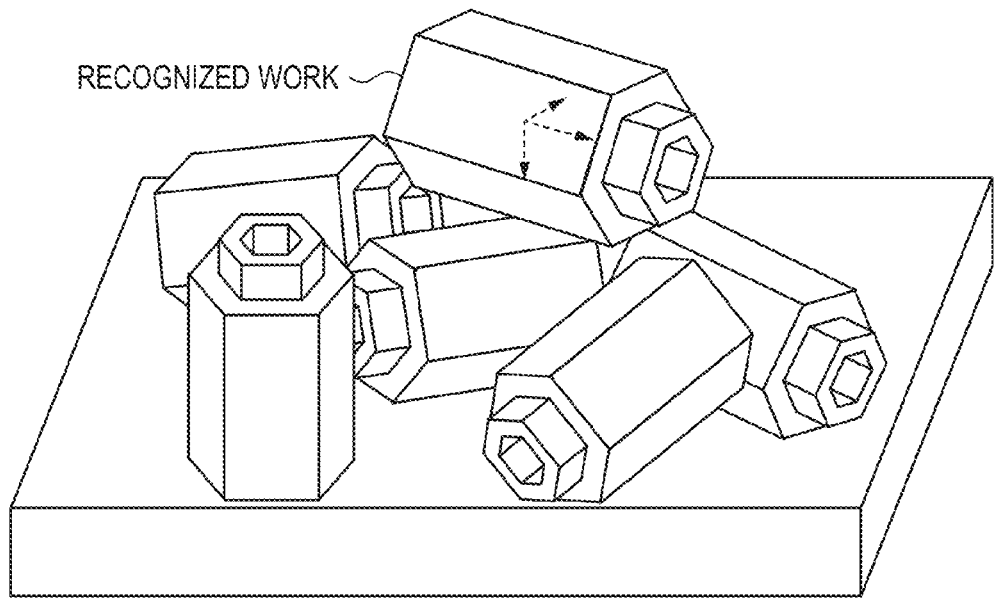
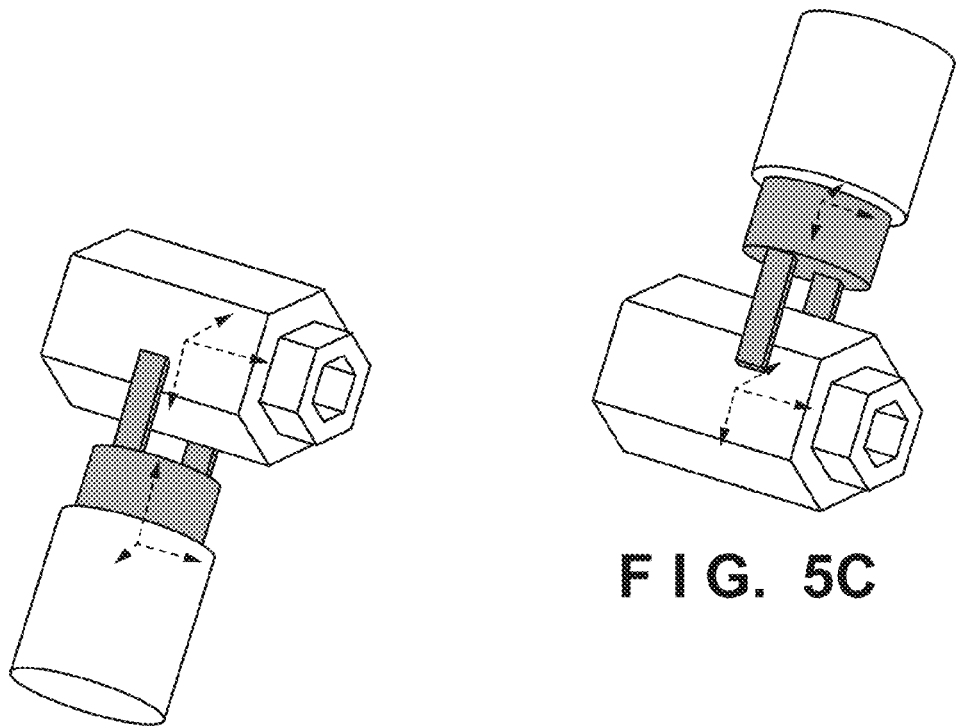
FIG. 5C
FIG. 5B

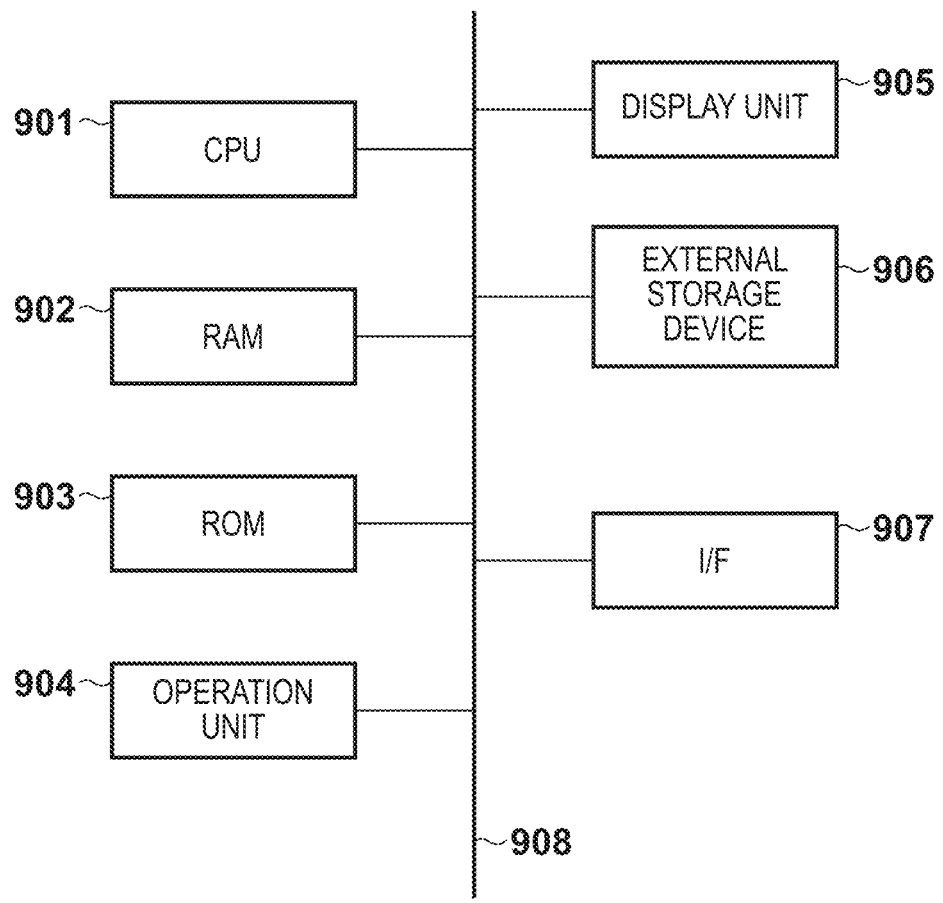

INFORMATION PROCESSING APPARATUS AND INFORMATION PROCESSING METHOD

BACKGROUND OF THE INVENTION

Field of the Invention

The present invention relates particularly to a technique for calculating the position and orientation of a hand with which a robot grips a work which has a rotational symmetric shape and whose three-dimensional position and orientation is recognized.

Description of the Related Art

In recent years, pile picking techniques have been developed, which specify one individual out of piled works using a vision system and recognize its three-dimensional position and orientation, thereby causing a hand attached to a robot to grip the individual in the production line of a factory or the like. The piled works take various orientations. For this reason, the vision system obtains the triaxial orientation of each work together with the position in the three-dimensional space. Additionally, the position and orientation in which the hand is to be approached to grip a recognized work is taught, and the hand is operated based on the two positions and orientations, thereby picking a work in an arbitrary position and orientation in the pile.

Concerning the above technique, patent literature 1 (Japanese Patent Laid-Open No. 2006-130580) describes a method of recognizing a work having a simple shape like a rectangular parallelepiped, a cylinder, or a sphere by a vision system and gripping it by a robot hand. In this method, first, a shot image is fitted to the simple shape (rectangular parallelepiped, cylinder, or sphere), and the orientation, size, and position of the principal axis of the fitted shape are calculated. In addition, each method of calculating the position and orientation in which the robot hand grips a work is defined as a rule in advance, and the grip position and orientation is calculated based on the rules, thereby gripping a work in an arbitrary position and orientation.

In the above-described pile picking technique, when a work has a rotational symmetric shape, there are a plurality of orientations in which the same information can be observed from the vision system. In this case, the vision system cannot discriminate the orientations and therefore outputs a plurality of solutions for a work in an orientation. When gripping based on a taught grip position and orientation for one of the plurality of solutions, the position and orientation of the hand to be approached depends on the three-dimensional position and orientation recognized by the vision system. For this reason, a case occurs where the hand approach direction calculated based on the teaching information is reverse to that taught, and a work that is actually grippable is determined to be ungrippable.

In the method of patent literature 1, however, no triaxial orientation is calculated as the orientation information of a work. Only the orientation of the principal axis of a simple shape is calculated, and the orientation of the hand to be approached is decided by a calculation method defined as a rule in advance. For this reason, even when the subject is a rotational symmetric object, the problem of outputting a plurality of solutions by obtaining a triaxial orientation is avoided. In this method, however, the method of calculating the position and orientation of the hand that grips a work is individually programmed in accordance with the hand shape, settings of the hand coordinate system, and the work shape assuming that the work has a simple shape. Hence, the work can be gripped only by the method. For this reason, if a work has an asymmetric shape with respect to its center of gravity, the user cannot individually set the grip position and orientation by, for example, shifting the grip position in accordance with the shape characteristic.

SUMMARY OF THE INVENTION

The present invention has been made in consideration of the problems, and provides a technique for calculating an appropriate position and orientation in which a hand grips, based on a grip position and orientation taught by a user, a work which has a rotational symmetric shape and whose three-dimensional position and orientation is recognized out of piled works.

According to the first aspect of the present invention, there is provided an information processing apparatus comprising: a first acquisition unit configured to acquire, as a reference orientation, an orientation designated in advance as an orientation that a grip unit is to take to grip an object having a shape of rotational symmetry with respect to at least one axis; a second acquisition unit configured to acquire, as a taught position and orientation, a relative position and orientation of the object and the grip unit in case that the grip unit grips the object; a derivation unit configured to recognize a position and orientation of the object from an image including the object, and based on the recognized position and orientation and the taught position and orientation, derive an initial position and an initial orientation in which the grip unit grips the recognized object; and a decision unit configured to decide a grip orientation to grip the object based on the reference orientation and the derived initial orientation, and decide, based on the decided grip orientation and the initial position, a grip position and orientation in which the grip unit grips the object.

According to the second aspect of the present invention, there is a provided an information processing method performed by an information processing apparatus, comprising: a first acquisition step of acquiring, as a reference orientation, an orientation designated in advance as an orientation that a grip unit is to take to grip an object having a shape of rotational symmetry with respect to at least one axis; a second acquisition step of acquiring, as a taught position and orientation, a relative position and orientation of the object and the grip unit in case that the grip unit grips the object; a derivation step of recognizing a position and orientation of the object from an image including the object, and based on the recognized position and orientation and the taught position and orientation, derive an initial position and an initial orientation in which the grip unit grips the recognized object; and a decision step of deciding a grip orientation to grip the object based on the reference orientation and the derived initial orientation, and decide, based on the decided grip orientation and the initial position, a grip position and orientation in which the grip unit grips the object.

Further features of the present invention will become apparent from the following description of exemplary embodiments with reference to the attached drawings.

BRIEF DESCRIPTION OF THE DRAWINGS

FIGS. 5A to 5C are views for explaining the initial position and orientation of the hand;

FIG. 9 is a block diagram showing an example of the hardware arrangement of an apparatus applicable to a grip position and orientation calculation apparatus 1.

DESCRIPTION OF THE EMBODIMENTS

Figure 1:
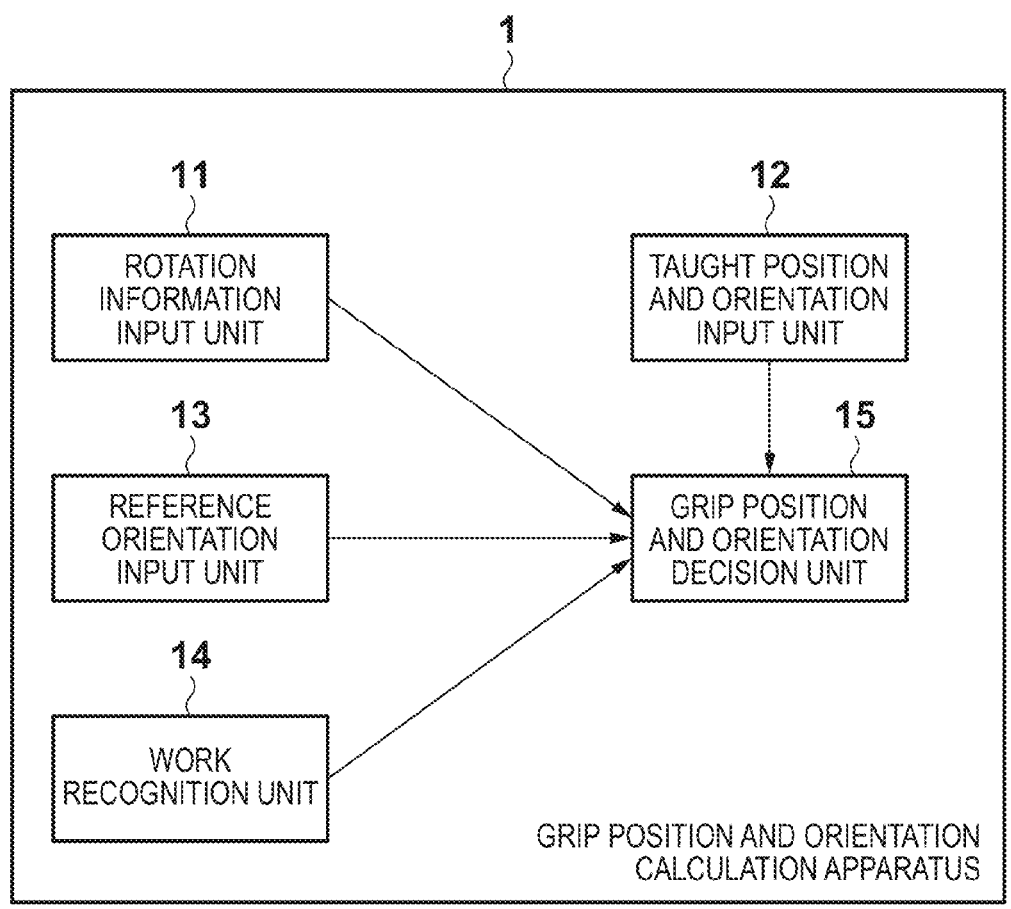
FIG. 1 is a block diagram showing an example of the functional arrangement of a grip position and orientation calculation apparatus 1.
Figure 2A:
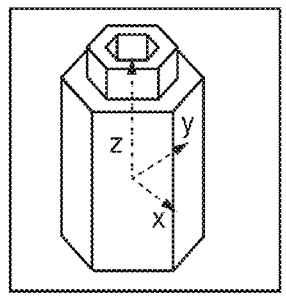
FIGS. 2A to 2E are views showing display examples of a GUI configured to input rotation information.
Figure 2B:
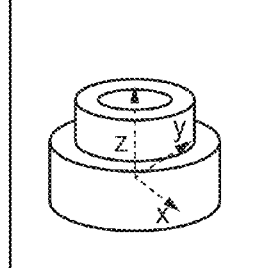
Figure 2C:
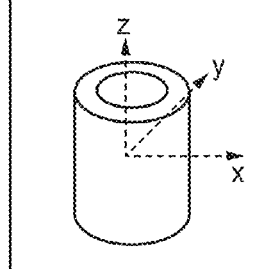
Figure 2D:
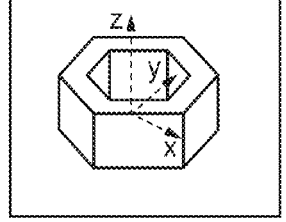
Figure 2E:
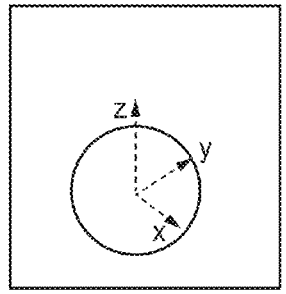

The embodiments of the present invention will now be described with reference to the accompanying drawings. Note that the embodiments to be described below are examples of detailed implementation of the present invention or detailed examples of the arrangement described in the appended claims.

First Embodiment

In this embodiment, it is an object to calculate the position and orientation of a grip unit so as to cause the grip unit to grip an object (work) having a shape of rotational symmetry (rotational symmetric shape). The rotational symmetric shapes include a "rotation member" that does not change its appearance at all when rotated about a certain axis and "N-fold symmetry" that overlaps itself when rotated by 360/N degrees (N is an integer of 2 or more). In consideration of this, the rotational symmetric shapes are classified into the following five types.

(a) N-fold symmetry with respect to one axis: for example, pyramid.

(b) Rotation member with respect to one axis: for example, cone.

(c) 2-fold symmetry with respect to one of two axes perpendicular to each other and a rotation member with respect to the other axis: for example, cylinder.

(d) 2-fold symmetry with respect to one of two axes that are perpendicular to each other and N-fold symmetry with respect to the other axis: for example, prism.

(e) Rotation member with respect two axes that are perpendicular to each other: for example, sphere.

In this embodiment, a method of calculating a grip position and orientation appropriate to cause a grip unit to grip a work having the shape (a), that is, N-fold symmetry with respect to one axis out of (a) to (e) above will be described. More specifically, after recognizing the three-dimensional position and orientation of a work, the position and orientation of the grip unit is calculated based on a taught position and orientation for each work in a symmetry orientation obtained by rotating the work about an axis based on the N-fold symmetry of the work. Out of the calculated positions and orientations, a position and orientation closest to a reference orientation set (designated) in advance is selected as the final position and orientation of the grip unit.

An example of the functional arrangement of a grip position and orientation calculation apparatus 1 that functions as an information processing apparatus for calculating the grip position and orientation of a grip unit configured to grip a work will be described first with reference to the block diagram of FIG. 1.

A rotation information input unit 11 inputs rotation information that is information used to express the rotational symmetric shape of a work, and sends the input rotation information to a grip position and orientation decision unit 15 at the subsequent stage. More specifically, the rotation information input unit 11 inputs, as the rotation information, information that holds a necessary number of sets each including the direction of an axis that defines the rotational symmetry of a work, information representing whether the work is a rotation member or has N-fold symmetry with respect to the axis, and a number N that specifies the symmetry number when the work has N-fold symmetry.

The rotation information input method is not limited to a specific method. Rotation information held by an external device can be acquired. Alternatively, rotation information input by the user by operating an operation unit (not shown) may be acquired. For example, an input method of inputting rotation information by causing the user to operate the operation unit (not shown) while viewing a GUI (Graphical User Interface) displayed on the display unit (not shown) of the grip position and orientation calculation apparatus 1 will be described here. In this case, the rotation information input unit 11 acquires rotation information thus input by the user operation.

FIGS. 2A to 2E show display examples of the GUI configured to input rotation information. More specifically, FIGS. 2A to 2E show display examples of the GUI configured to input rotation information for works corresponding to (a) to (e) above. To simplify the description, each axis that defines the rotational symmetry of a work shape is assumed to match one of the x-, y-, and z-axes of a coordinate system (coordinate system having one point of a work as the origin and three axes perpendicular to each other at the origin as the x-, y-, and z-axes: work coordinate system) based on the work shape. However, when the orientation of the rotation axis can be specified in the work coordinate system, the rotation axis can be an arbitrary axis.

The GUI displays the shape of a work and a work coordinate system based on the work shape. The GUI also displays check boxes used to select a rotation axis that defines the rotational symmetry of the work shape. The rotation axis of the work is selected out of the x-, y-, and z-axes of the work coordinate system based on the work shape. Note that two axes can be selected at maximum. In addition, one of the rotation member and N-fold symmetry is selected by a radio button associated with each selected axis. Each radio button is preferably enabled when the axis is selected. When N-fold symmetry is selected, the value of N is input to a window associated with each selected axis. Each window is also preferably enabled when N-fold symmetry is selected. For example, in FIG. 2A, the work has N-fold symmetry (N=6) about the z-axis. Hence, the check box corresponding to the z-axis is selected (marked), the radio button corresponding to N-fold symmetry is selected, and "6" is input to the window.

The rotation information input unit 11 expresses rotational symmetries with respect to the x-, y-, and z-axes of the work by three parameters xRot, yRot, and zRot, respectively, based on the information input via the GUI, and inputs them as the rotation information of the work. More specifically, when the check box of an axis is disabled, the work has no rotational symmetry about the axis, and 1 is set to the parameter corresponding to the axis. On the other hand, when a check box is enabled, and rotation member is selected, 0 is set to the parameter corresponding to the axis. When N-fold symmetry is selected, the value of N input to the window is set to the parameter corresponding to the axis. For example, in FIG. 2A, since the check boxes of the x- and y-axis are disabled, xRot=yRot=1. For the z-axis, since the check box is enabled, the radio button of N-fold symmetry is selected, and 6 is input to the window, zRot=6. In this case, the rotation information input unit 11 inputs {xRot, yRot, zRot}={1, 1, 6} as rotation information.

Note that when a work has rotational symmetry about two axes, a plurality of axis selection methods are considerable. For example, the work shown in FIG. 2C has 2-fold symmetry about the x-axis and simultaneously has 2-fold symmetry about the y-axis. Hence, in such a case, either check box can be marked. The rotational symmetry of a work can be expressed by two axes at maximum independently of its shape. Hence, in this embodiment, two axes can be selected at maximum. However, three axes may be selectable. In this embodiment, a radio button is used to select rotation member or N-fold symmetry. However, a check box or any other GUI may be used. Not the value of N of N-fold symmetry but a rotation angle (360/N) for N-fold symmetry may be input. Furthermore, any method can be used to input rotation information as long as the number of axes that express rotational symmetry and the orientation of each axis, whether a work is a rotation member about each axis, or a numerical value capable of specifying the rotational symmetry number for an axis other than rotation member can be input.

A taught position and orientation input unit 12 inputs parameters as a taught position and orientation representing the relative position and orientation of a work and a grip unit (hand) attached to the distal end of a robot arm when the work is gripped by the hand. As the taught position and orientation, for example, a position and orientation set in advance by operating the geometric models of the hand and the work on a virtual environment, arranging them in the geometric relationship at the time of grip, and acquiring the relative position and orientation at that time is used. Alternatively, the three-dimensional position and orientation of the work arranged in a real environment is recognized by a vision system, and after that, the robot arm is moved to a position and orientation in which the hand can grip the work, and the position and orientation of the hand at that time is acquired. The relative position and orientation of the hand and the work may thus be calculated and used. The taught position and orientation can be set by any method as long as it can decide the relative position and orientation of the hand and the work at the time of grip.

A reference orientation input unit 13 inputs a reference orientation used to compare the orientation of the hand when deciding the position and orientation of the hand that grips a work in an arbitrary position and orientation recognized out of piled works based on the taught position and orientation input by the taught position and orientation input unit 12. An ideal orientation in which the robot arm can grip a work without burden on the joints is preferably set as the reference orientation. However, when the grip position and orientation is taught using a real robot hand and a real work, the orientation of the hand at the time of teaching can be used.

A work recognition unit 14 detects one work (one individual) out of a number of piled works. The work recognition unit 14 then calculates the three-dimensional position and orientation of the detected work in the robot coordinate system (coordinate system having one point of the robot as the origin and three axes perpendicular to each other at the origin as the x-, y-, and z-axes).

First, the position and orientation of the work in a sensor coordinate system is calculated. In this embodiment, measurement of the work is performed using a range sensor, thereby acquiring the range image and the grayscale image of the work. Hence, the sensor coordinate system in this case is a coordinate system having one point of the range sensor as the origin and three axes perpendicular to each other at the origin as the x-, y-, and z-axes.

First, for example, one individual is detected from piled works, and its coarse position and orientation is calculated by a known technique such as pattern matching. After that, the position and orientation of the three-dimensional geometric model of the work is corrected based on the calculated coarse position and orientation such that the three-dimensional geometric model and the acquired image fit to each other, thereby calculating the precise position and orientation of the work. However, any other method is usable as the calculation method of the work on the sensor coordinate system.

The calculated position and orientation of the work on the sensor coordinate system is transformed into the position and orientation of the work on the robot coordinate system using the "position and orientation between the range sensor and the robot" obtained by calibration in advance. The geometric relationship between the range sensor and the robot is here assumed to be fixed. In this embodiment, the range sensor is fixed vertically above the piled works, as described. However, the range sensor may be fixed to the robot arm.

The grip position and orientation decision unit 15 receives the rotation information from the rotation information input unit 11, the reference orientation from the reference orientation input unit 13, the "position and orientation of the work on the robot coordinate system" from the work recognition unit 14, and the taught position and orientation from the taught position and orientation input unit 12. Using these pieces of received information, the grip position and orientation decision unit 15 decides the position and orientation of the hand that grips the work in an orientation closest to the reference orientation as the grip position and orientation. More specifically, in consideration of the rotational symmetry of the shape for the recognized work, the grip position and orientation is decided out of the hand orientations having the same geometric relationship as that between the hand and the work at the time of teaching such that the orientation most matches the reference orientation.

Figure 3:
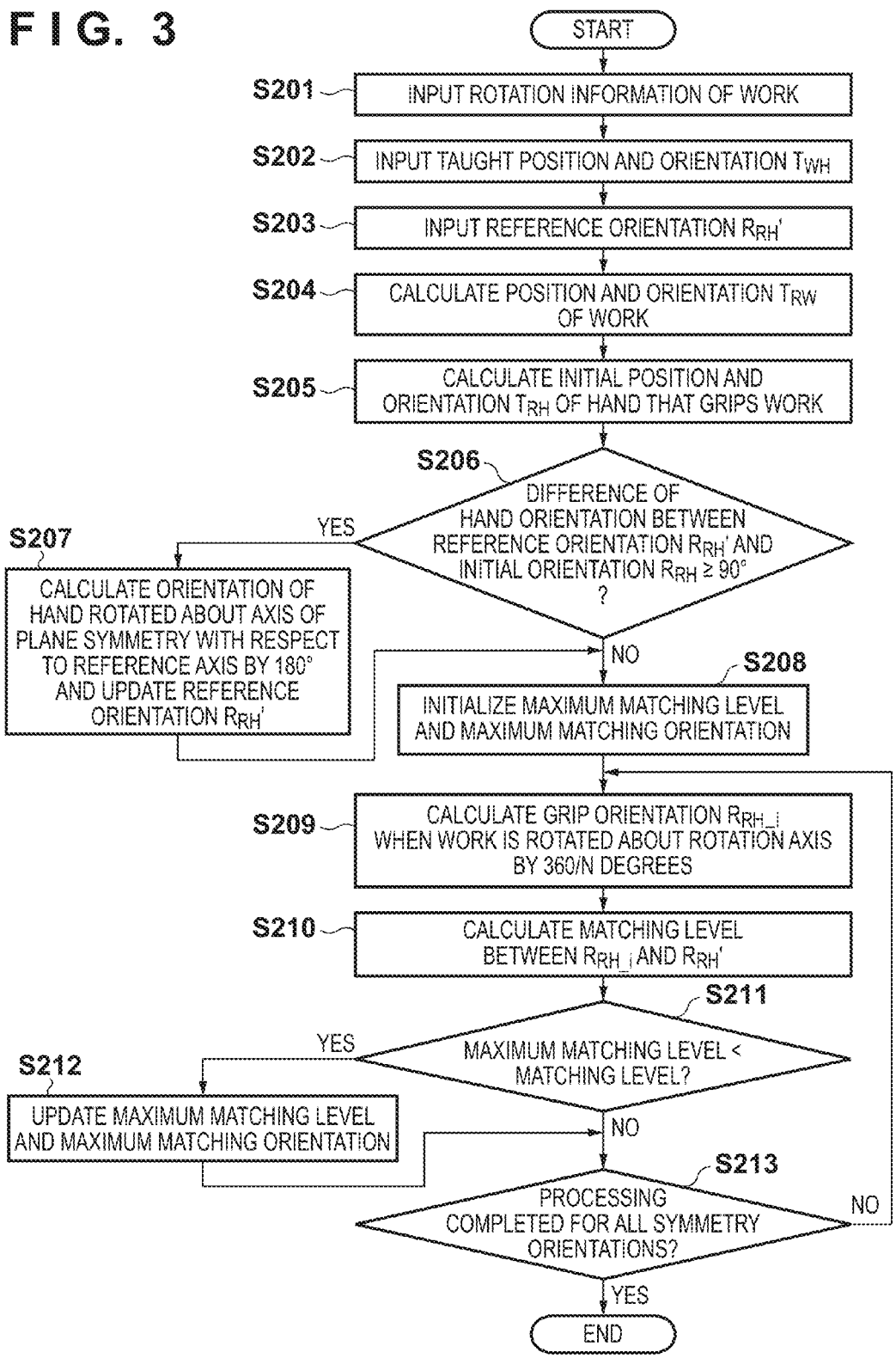
FIG. 3 is a flowchart of processing performed by the grip position and orientation calculation apparatus 1.

Processing to be performed by the grip position and orientation calculation apparatus 1 to calculate the position and orientation of the hand to grip a work whose three-dimensional position and orientation is recognized will be described next with reference to FIG. 3 that illustrates the flowchart of the processing.

(Process of Step S201)

The rotation information input unit 11 acquires rotation information as described above. To make an explanation using a detailed example below, the rotation information input unit 11 is assumed to acquire rotation information set for the work shown in FIG. 2A using the GUI shown in FIG. 2A. In this case, the rotation information is {xRot, yRot, zRot}={1, 1, 6}, as described above. In addition, the rotation information input unit 11 sets a value other than 1 out of the parameter values for the axes in the rotation information to the variable N as the rotational symmetry number. Since the value other than 1 out of the parameter values for the axes in the rotation information is "6" here, the value "6" is set to the variable N.

(Process of Step S202)

Figure 4:
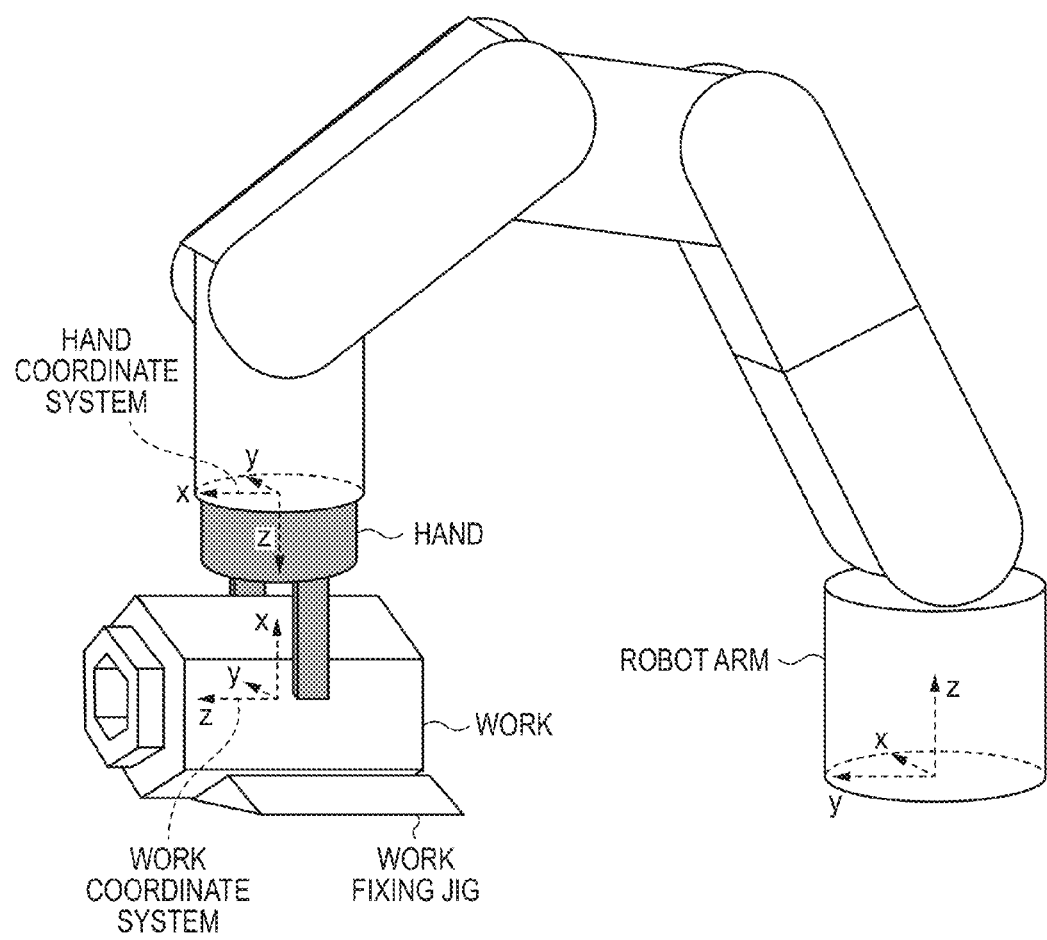
FIG. 4 is a view showing an example of teaching of a position and orientation when a hand grips a work.

The taught position and orientation input unit 12 inputs 6-degree-of-freedom parameters representing the relative position and orientation of the work and the hand as the taught position and orientation. FIG. 4 shows an example of teaching of the position and orientation when the hand grips a work. FIG. 4 illustrates a state in which after the three-dimensional position and orientation of the work on the robot coordinate system is calculated by the vision system, the robot is moved up to the position and orientation in which the hand attached to the distal end of the robot arm can grip the work and stopped. The relative position and orientation of the hand and the work is calculated in advance as the taught position and orientation from the position and orientation of the hand and that of the work on the robot coordinate system at this time and stored in a memory in or outside the apparatus. In step S202, the taught position and orientation input unit 12 acquires the taught position and orientation from the memory.

Let $R_{WH}$ and $t_{WH}$ be a 3×3 rotation matrix used to do orientation transformation from the work coordinate system to a hand coordinate system (coordinate system having one point of the hand as the origin and three axes perpendicular to each other at the origin as the x-, y-, and z-axes) and three translation vectors used to do position transformation, respectively. At this time, transformation from the work coordinate system $X_W = [X_W, Y_W, Z_W]^T$ to the hand coordinate system $X_H = [X_H, Y_H, Z_H]^T$ can be represented using a 4×4 matrix $T_{WH}$ as $$X_H' = T_{WH} X_W'$$

where $X_W'$, $X_H'$, and $T_{WH}$ are given by $$X_W' = [X_W, Y_W, Z_W, 1]^T, X_H' = [X_H, Y_H, Z_H, 1]^T$$

$$T_{WH} = \begin{bmatrix} R_{WH} & t_{WH} \\ 0^T & 1 \end{bmatrix}$$

$T_{WH}$, $R_{WH}$, and $t_{WH}$ will sometimes be referred to as a taught position and orientation, a taught orientation, and a taught position, respectively, hereinafter.

(Process of Step S203)

The reference orientation input unit 13 acquires the above-described reference orientation. Generally, when teaching the position and orientation of the hand that grips a work, in many cases, the work is set in a position and orientation that allows the robot arm to easily operate, and the grip position and orientation is taught. Hence, in this embodiment, the orientation of the hand on the robot coordinate system in the state shown in FIG. 4 in step S202 is stored in the memory as the reference orientation in advance. The reference orientation input unit 13 acquires the reference orientation stored in the memory. Let $R_{RH}'$ be a 3×3 rotation matrix representing orientation transformation from the robot coordinate system to the hand coordinate system. $R_{RH}'$ is acquired as the reference orientation.

(Process of Step S204)

The work recognition unit 14 detects an individual work (grip target work) to be gripped out of a number of piled works, and calculates six parameters representing the position and orientation of the grip target work on the robot coordinate system. In coordinate transformation from the robot coordinate system to the work coordinate system based on the six parameters calculated here, let $R_{RW}$ be a 3×3 rotation matrix expressed by three parameters representing the orientation, and $t_{RW}$ be three translation vectors expressed by three parameters representing the position. At this time, transformation from the robot coordinate system $X_R = [X_R, Y_R, Z_R]^T$ to the work coordinate system $X_W = [X_W, Y_W, Z_W]^T$ can be represented using a 4×4 matrix $T_{RW}$ as $$X_W' = T_{RW} \times X_R'$$

where $X_W'$ and $X_R'$ are given by $$X_W' = [X_W, Y_W, Z_W, 1]^T, X_R' = [X_R, Y_R, Z_R, 1]^T$$

$$T_{RW} = \begin{bmatrix} R_{RW} & t_{RW} \\ 0^T & 1 \end{bmatrix}$$

$T_{RW}$, $R_{RW}$, and $t_{RW}$ will sometimes be referred to as a recognized position and orientation, a recognized orientation, and a recognized position, respectively, hereinafter.

(Process of Step S205)

The grip position and orientation decision unit 15 calculates (derives) an initial position and orientation used to decide the position and orientation of the hand configured to grip the grip target work. Let $T_{RH}$ be a 4×4 matrix representing the initial position and orientation to be obtained here. $T_{RH}$ can be calculated by $$T_{RH} = T_{RW} T_{WH}$$

Let $R_{RH}$ be a 3×3 rotation matrix, and $t_{RH}$ be three translation vectors. $T_{RH}$ is expressed as $$T_{RH} = \begin{bmatrix} R_{RH} & t_{RH} \\ 0^T & 1 \end{bmatrix}$$

$t_{RH}$ and $R_{RH}$ will sometimes be referred to as the initial position of the hand and the initial orientation of the hand, respectively, hereinafter. FIG. 5B shows the initial position and orientation of the hand calculated based on the taught position and orientation input in step S202 for a work whose three-dimensional position and orientation is recognized out of the pile in FIG. 5A.

(Process of Step S206)

If the orientation difference amount (difference value) between the reference orientation acquired by the reference orientation input unit 13 and the initial orientation of the hand obtained in step S205 is large, the magnitude relationship of the matching level when comparing the reference orientation and a comparison orientation (to be described later) from step S211 reverses. In this case, the reference orientation needs to be reset. In this step, the grip position and orientation decision unit 15 obtains the orientation difference value between the reference orientation and the initial orientation, and determines based on the difference amount whether the reference orientation needs to be reset. More specifically, a 3×3 rotation matrix D used to transform the reference orientation into the initial orientation is obtained. In addition, an angle θ when the orientation transformation between them is expressed by a rotation axis and a rotation angle is calculated from the rotation matrix D. The rotation matrix D and the rotation angle θ can be calculated by $$D = (R_{RH})^{-1} R_{RH}'$$

$$\theta = \arccos((\text{Trace}(D) - 1)/2)$$

The grip position and orientation decision unit 15 determines whether θ<90°. If θ<90° as the result of determination, the grip position and orientation decision unit 15 determines that the reference orientation need not be reset, and the process advances to step S208. On the other hand, if θ≥90° (predetermined value or more), the grip position and orientation decision unit 15 determines that the reference orientation needs to be reset, and the process advances to step S207.

(Process of Step S207)

The grip position and orientation decision unit 15 resets the reference orientation. More specifically, an orientation in which the hand having the reference orientation becomes symmetric with respect to the rotation axis of the work in the taught position and orientation of the hand is obtained and updated as the reference orientation of the hand. To do this processing, first, concerning the hand and the work which have the relationship of the taught position and orientation, an axis perpendicular to the central axis of the hand and the rotation axis of the work (z-axis in this embodiment) is obtained as a transformation axis. In this case, the central axis of the hand is assumed to be the z-axis. As the rotation axis of the work, an axis corresponding to the value other than 1 out of the parameter values for the axes in the rotation information {xRot, yRot, zRot}={1, 1, 6}, that is, the z-axis is used. An orientation obtained by rotating the hand having the reference orientation about the obtained transformation axis by 180° is calculated, and the reference orientation $R_{RH}'$ is updated by the calculated orientation.

$$R_{RH}' = R_{rev} R_{RH}'$$

where $R_{rev}$ is a 3×3 rotation matrix that performs 180° rotation about the transformation axis.

(Process of Step S208)

The grip position and orientation decision unit 15 performs initialization to decide a grip orientation of high matching level with the reference orientation of the hand. First, let Vmax be a value representing the maximum matching level of the orientation. Vmax is initialized to a small value (for example, Vmax=−100000). Next, an orientation that maximizes the matching level is defined as a maximum matching orientation. Let Rmax be a 3×3 rotation matrix representing the orientation. Rmax is initialized to the initial orientation of the hand (Rmax=$R_{RH}$). Let Rmax_w be a 3×3 rotation matrix representing the orientation of the work at this time. Rmax_w is initialized to the recognized orientation of the work (Rmax_w=$R_{RW}$). Furthermore, a counter configured to count the number of rotations of the work about the rotation axis is defined as i and initialized to i=0.

(Process of Step S209)

The grip position and orientation decision unit 15 first sets an axis corresponding to the value other than 1 out of the parameter values for the axes in the rotation information {xRot, yRot, zRot}={1, 1, 6}, that is, the z-axis as the rotation axis. An orientation (rotated orientation) when the recognized orientation $R_{RW}$ is rotated about the rotation axis by (360/N×i) degrees is obtained. An orientation (comparison orientation) $R_{RH\_i}$ of the hand having the relationship of the taught orientation with respect to the obtained orientation is obtained as a grip orientation used to grip the grip target work having the obtained orientation. The comparison orientation $R_{RH\_i}$ can be calculated by $$R_{RH\_i} = R_{RW} R_i R_{WH}$$

where $R_i$ is a 3×3 rotation matrix that performs (360/N×i)-degree rotation about the rotation axis of the work.

(Process of Step S210)

The grip position and orientation decision unit 15 calculates the matching level of orientation between the reference orientation $R_{RH}'$ and the comparison orientation $R_{RH\_i}$ calculated in step S209 as $V_i$. More specifically, an angle φ when the orientation transformation is expressed by a rotation axis and a rotation angle is obtained from a rotation matrix E used to do orientation transformation between the comparison orientation and the reference orientation, and the matching level is calculated as $V_i$=cos θ. Note that the rotation matrix E and the rotation angle φ can be calculated by $$E = (R_{RH})^{-1} R_{RH}'$$

$$\varphi = \arccos((\text{Trace}(E)-1)/2)$$

(Process of Step S211)

The grip position and orientation decision unit 15 compares Vmax with the matching level $V_i$ calculated in step S210. If Vmax<$V_i$ as the result of comparison, the process advances to step S212. If Vmax $V_i$, the process advances to step S213.

(Process of Step S212)

The grip position and orientation decision unit 15 updates the value of the maximum matching level Vmax of orientation by $V_i$. The grip position and orientation decision unit 15 also updates the maximum matching orientation Rmax by the comparison orientation $R_{RH\_i}$. The grip position and orientation decision unit 15 also updates Rmax_w by $R_{RW} R_i$.

(Process of Step S213)

The grip position and orientation decision unit 15 determines whether i<N. If i<N as the result of determination, the value of the counter i is incremented by one and updated (i←i+1), and the process returns to step S209. On the other hand, if i≥N, a final grip position and orientation $T_{RH\_max}$ of the hand to grip the grip target work is calculated, using the initial position $t_{RH}$ and the orientation Rmax of the highest matching level out of all symmetry orientations of N-fold symmetry, by $$T_{RH\_max} = \begin{bmatrix} R_{max} & t_{RH} \\ 0^T & 1 \end{bmatrix}$$

The grip position and orientation decision unit 15 outputs the thus calculated final grip position and orientation $T_{RH\_max}$ of the hand to an appropriate output destination. The output destination is not limited to a specific output destination. That is, the grip position and orientation can be output to either the memory in or outside the apparatus or a control device that controls the robot arm having the hand. At any rate, when the hand is moved to the final grip position and orientation $R_{RH\_max}$ by controlling the robot arm, the grip target work recognized in the pile can be gripped in an orientation similar to the taught position and orientation. Note that FIG. 5C shows the grip position and orientation of the hand finally calculated by performing the series of processes according to this embodiment for the recognized work shown in FIG. 5A.

In this embodiment, the method of calculating the appropriate grip position and orientation of the hand for the "work having N-fold symmetry with respect to one axis" recognized in the pile has been explained. More specifically, each grip orientation of the hand when the work is rotated about the rotation axis from its recognized orientation by 360/N degrees is calculated as the comparison orientation, and an orientation most matching with the reference orientation is selected from the comparison orientations, thereby deciding the grip position and orientation.

Note that in this embodiment, the cosine value of the rotation angle representing orientation transformation between the reference orientation and the comparison orientation is used as the matching level. However, the difference amount of the angle may directly be used as the matching level. Alternatively, the sum of rotation amounts about each axis when the rotation matrix is expressed as Eulerian angles may be used. Any other index capable of evaluating the matching level of orientation can also be used.

Here, the orientation of the hand on the robot coordinate system is used as the reference orientation. However, the orientation of the hand on the sensor coordinate system may be used. Alternatively, an orientation on a separately set coordinate system may be used.

Here, the grip position and orientation of the hand for each orientation obtained by rotating the recognized work about the rotation axis is updated as the maximum matching orientation. However, the orientation obtained by rotating the recognized work about the rotation axis may be updated as the maximum matching orientation, and the orientation of the hand may finally be calculated based on the taught orientation.

Second Embodiment

In this embodiment, a method of calculating the appropriate grip position and orientation of a hand for a work having the rotational symmetric shape (b), that is, the shape of a rotation member with respect to one axis out of the above-described five types of rotational symmetric shapes (a) to (e) will be described. More specifically, after recognizing the three-dimensional position and orientation of the work, a grip position and orientation closest to a preset reference orientation is directly calculated based on the rotation axis that defines the rotation member of the work shape and a taught position and orientation.

The difference from the first embodiment will mainly be explained below, and a description of the same portions as in the first embodiment will be omitted. In this embodiment as well, the appropriate grip position and orientation of the hand is calculated using a grip position and orientation calculation apparatus 1 having the arrangement shown in FIG. 1.

Figure 6:
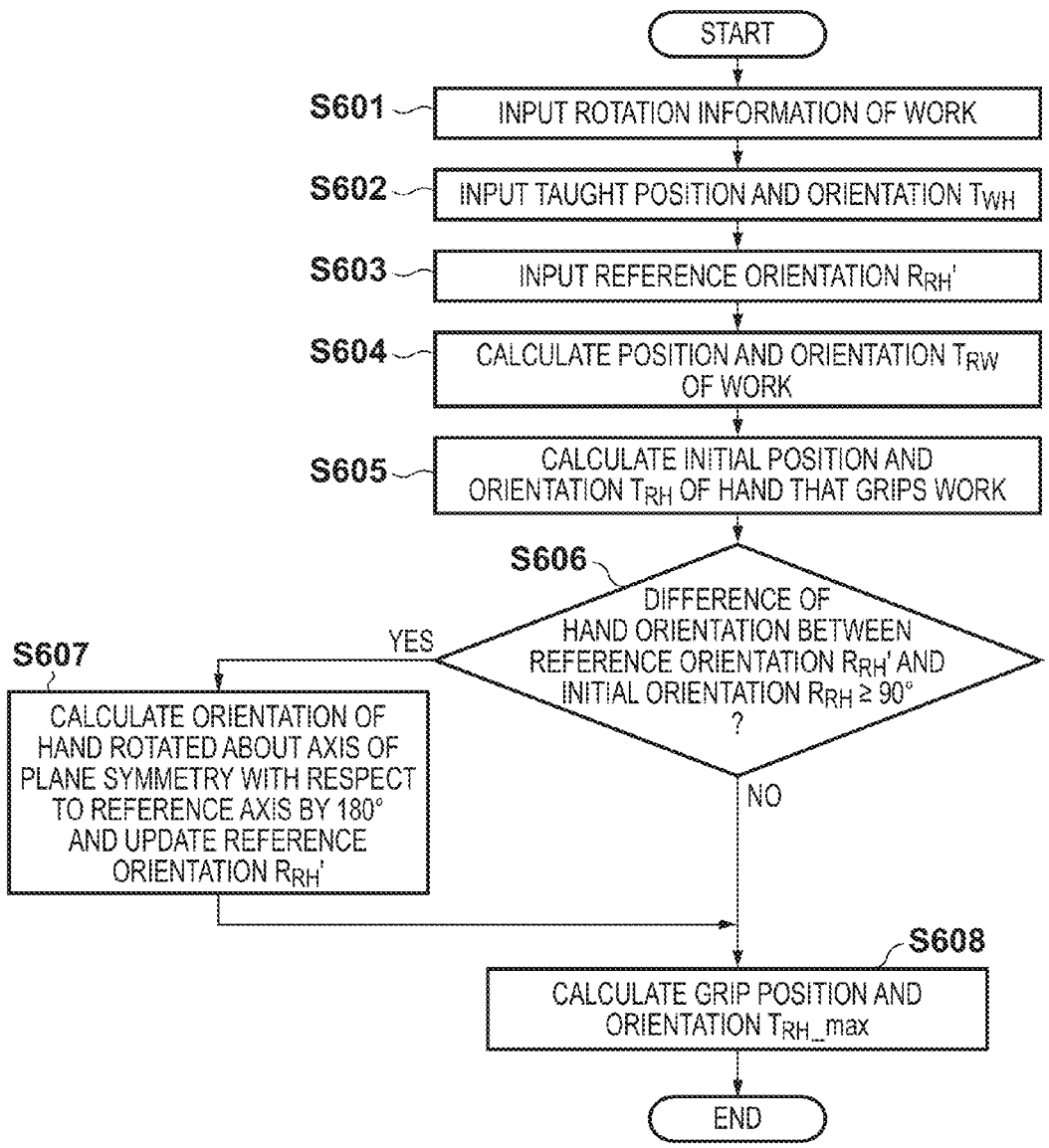
FIG. 6 is a flowchart of processing performed by a grip position and orientation calculation apparatus 1.

Processing to be performed by the grip position and orientation calculation apparatus 1 to calculate the appropriate grip position and orientation of the hand for a work having the shape of a rotation member with respect to one axis will be described with reference to FIG. 6 that illustrates the flowchart of the processing.

(Process of Step S601)

A rotation information input unit 11 acquires rotation information as described above. In this embodiment, the rotation information input unit 11 is assumed to acquire rotation information set for the work shown in FIG. 2B using the GUI shown in FIG. 2B. In this case, the rotation information is $\{xRot, yRot, zRot\}=\{1, 1, 0\}$.

(Processes of Steps S602 to S607)

The processes of steps S602 to S607 are the same as those of steps S202 to S207, and a description of the processes of steps S602 to S607 will be omitted.

(Process of Step S608)

Figure 7A:
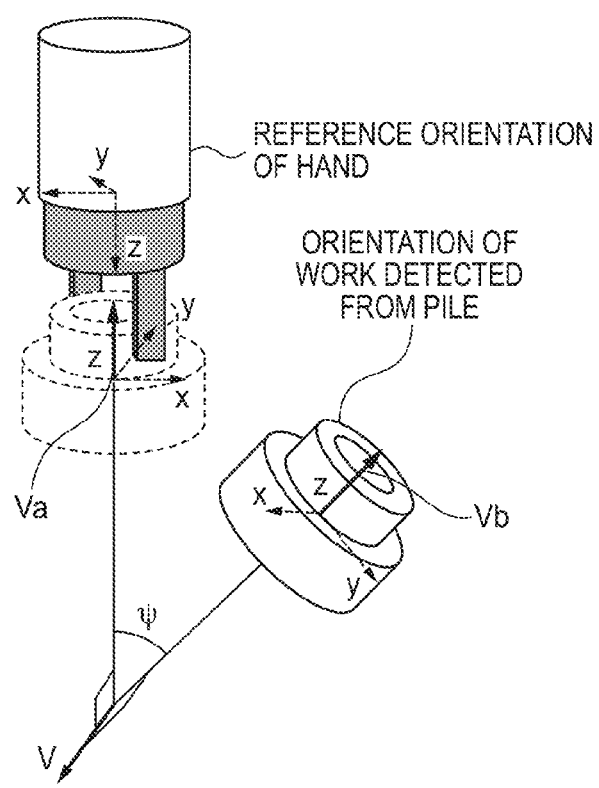
FIGS. 7A and 7B are views for explaining processing of step S608.

A grip position and orientation decision unit 15 calculates the position and orientation of the hand closest to the reference orientation as the grip position and orientation. This processing will be described with reference to FIGS. 7A and 7B. First, using a reference orientation $R_{RH}'$ and a taught orientation $R_{WH}$, the orientation of a virtual work (work indicated by the broken lines in FIG. 7A) grippable by the hand in the reference orientation is calculated as a reference work orientation $R_{RW}'$ by $$R_{RW}' = R_{RH}'(R_{WH})^{-1}$$

Next, an angle $\psi$ when orientation transformation between the reference work orientation $R_{RW}'$ and a recognized orientation $R_{RW}$ of the work is expressed by a rotation axis and a rotation angle is calculated from a rotation matrix F. The rotation matrix F and the rotation angle $\psi$ can be calculated by $$F = (R_{RW}')^{-1} R_{RW}$$

$$\psi = \arccos((\text{Trace}(F)-1)/2)$$

Here, an axis corresponding to the value "0" out of the parameter values for the axes in the rotation information $\{xRot, yRot, zRot\}=\{1, 1, 0\}$ input in step S601, that is, the z-axis is set as the rotation axis. At this time, let Va be the vector representing the rotation axis of the work in the reference work orientation, and Vb be the vector representing the rotation axis of the work in the recognized orientation of the work. A vector product $V=Va\times Vb$ is calculated. Let $R_{rot}$ be a 3×3 rotation matrix that performs rotation by $\psi$ about an axis expressed by the vector V. An orientation Rmax of the and that grips the recognized work is calculated by $$R\max = R_{rot} R_{RW}' R_{WH}$$

The grip position and orientation decision unit 15 calculates a final grip position and orientation $R_{RH\_max}$ of the hand to grip the grip target work by $$T_{RH\_max} = \begin{bmatrix} R_{max} & t_{RH} \\ 0^T & 1 \end{bmatrix}$$

Figure 7B:
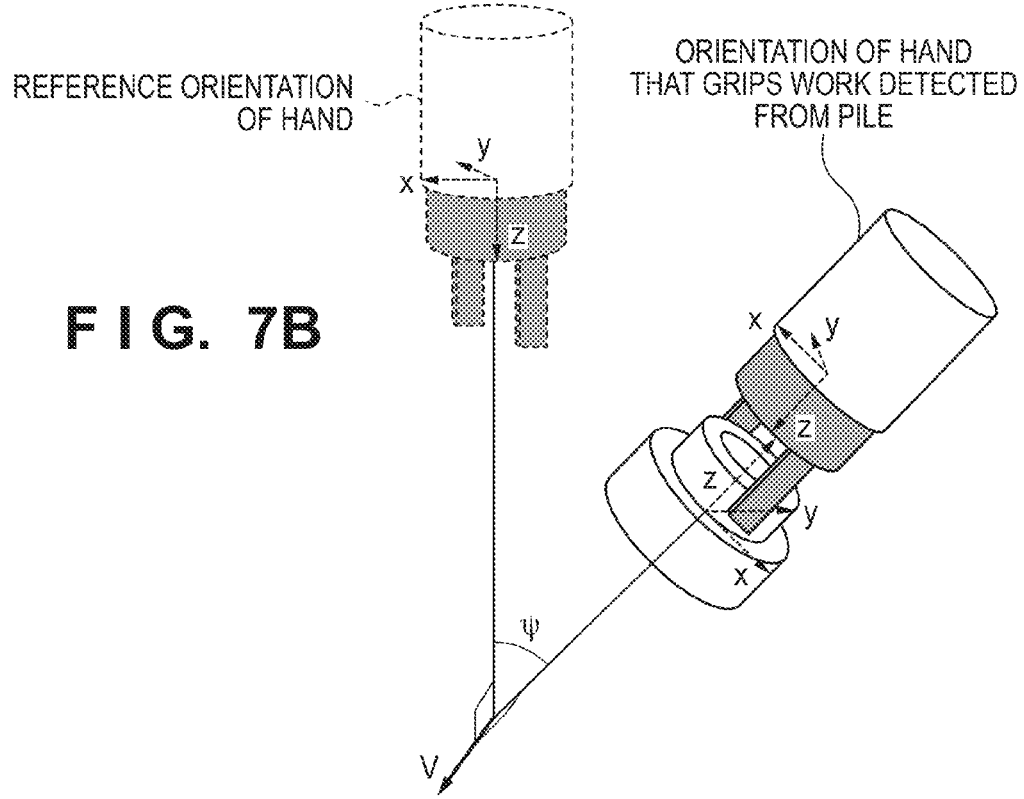

The grip position and orientation decision unit 15 outputs the thus calculated final grip position and orientation $T_{RH\_max}$ of the hand to an appropriate output destination, as in the first embodiment. At any rate, when the hand is moved to the final grip position and orientation $T_{RH\_max}$ by controlling the robot arm, the grip target work recognized in the pile can be gripped in an orientation similar to the taught position and orientation. Note that FIG. 7B shows the grip position and orientation of the hand finally calculated by performing the series of processes according to this embodiment for the recognized work shown in FIG. 7A.

In this embodiment, the method of calculating the appropriate grip position and orientation of the hand for the work having the shape of a rotation member with respect to one axis has been described. More specifically, the orientation difference amount between the work grippable in the reference orientation of the hand and the work recognized in the pile is obtained, and an orientation obtained by tilting the hand by the difference amount is directly calculated as the grip orientation.

Third Embodiment

In this embodiment, a method of calculating the appropriate grip position and orientation of a hand for a work having the rotational symmetric shape (c), that is, 2-fold symmetry with respect to one of two axes perpendicular to each other and the shape of a rotation member with respect to the other axis out of the above-described five types of rotational symmetric shapes (a) to (e) will be described. More specifically, after recognizing the work, a grip orientation closest to a reference orientation is first selected for the rotation axis that defines the 2-fold symmetry, as in the first embodiment. Next, using the selected orientation as the initial orientation, a grip position and orientation closest to the reference orientation is directly calculated for the rotation axis that defines the rotation member, as in the second embodiment.

The difference from the first embodiment will mainly be explained below, and a description of the same portions as in the first embodiment will be omitted. In this embodiment as well, the appropriate grip position and orientation of the hand is calculated using a grip position and orientation calculation apparatus 1 having the arrangement shown in FIG. 1.

Figure 8:
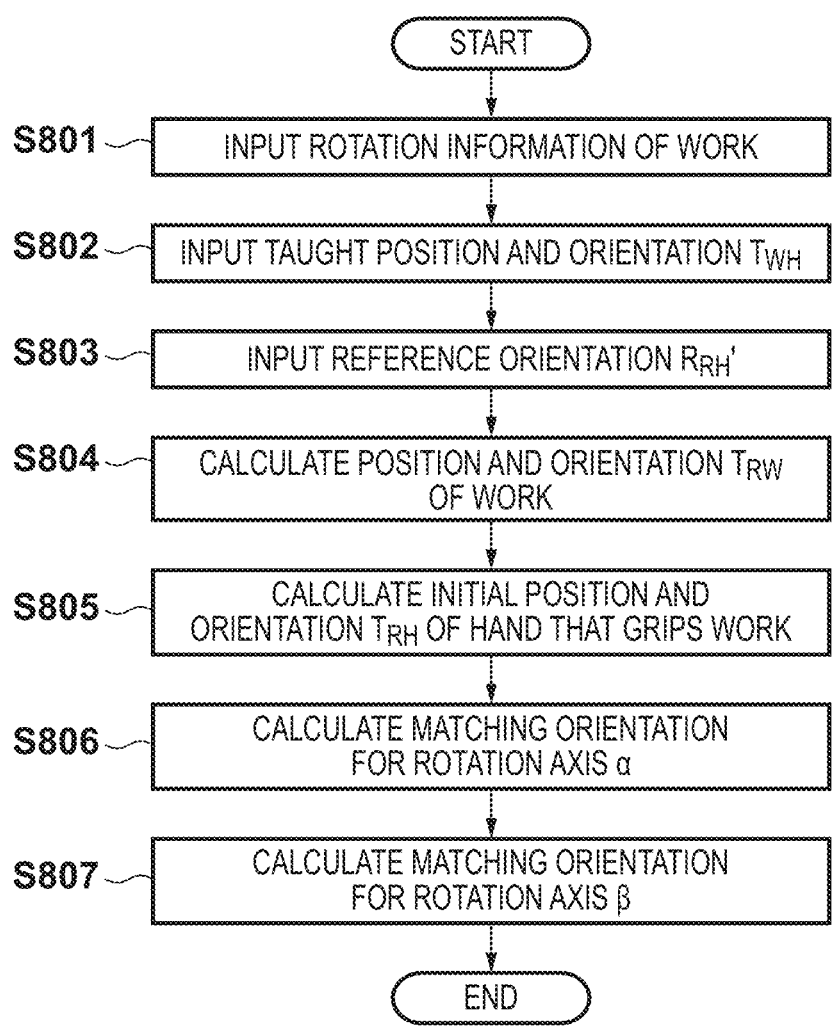
FIG. 8 is a flowchart of processing performed by a grip position and orientation calculation apparatus 1.

Processing to be performed by the grip position and orientation calculation apparatus 1 to calculate the appropriate grip position and orientation of the hand for a work having 2-fold symmetry with respect to one of two axes perpendicular to each other and the shape of a rotation member with respect to the other axis will be described with reference to FIG. 8 that illustrates the flowchart of the processing.

(Process of Step S801)

A rotation information input unit 11 acquires rotation information as described above. In this embodiment, the rotation information input unit 11 is assumed to acquire rotation information set for the work shown in FIG. 2C using the GUI shown in FIG. 2C. In this case, the rotation information is {xRot, yRot, zRot}={2, 1, 0}. In addition, the rotation information input unit 11 sets an axis corresponding to a positive integer value other than 1 out of the parameter values for the axes in the rotation information, that is, in this case, the x-axis as a rotation axis α, and an axis corresponding to the value "0" out of the parameter values for the axes in the rotation information, that is, in this case, the z-axis as a rotation axis β.

(Processes of Steps S802 to S805)

The processes of steps S802 to S805 are the same as those of steps S202 to S205, and a description of the processes of steps S802 to S805 will be omitted.

(Process of Step S806)

In step S806, the same processes as in steps S206 to S213 described above are performed concerning the rotation axis α.

(Process of Step S807)

An orientation Rmax_w of the work when the hand takes a maximum matching orientation TRH_max is newly set as a recognized orientation $R_{RW}$, and the same process as in step S608 described above is performed concerning the rotation axis β, thereby calculating the final grip position and orientation.

In this embodiment, the method of calculating the appropriate grip position and orientation of the hand for the work having 2-fold symmetry with respect to one of two axes perpendicular to each other and the shape of a rotation member with respect to the other axis has been described. More specifically, after recognizing the work, a grip orientation closest to the reference orientation is first selected for the rotation axis that defines the 2-fold symmetry, as in the first embodiment. Next, using the selected orientation as the initial orientation, a grip position and orientation closest to the reference orientation is directly calculated for the rotation axis that defines the rotation member, as in the second embodiment.

Fourth Embodiment

In this embodiment, a method of calculating the appropriate grip position and orientation of a hand for a work having the rotational symmetric shape (d), that is, 2-fold symmetry with respect to one of two axes perpendicular to each other and N-fold symmetry with respect to the other axis out of the above-described five types of rotational symmetric shapes (a) to (e) will be described. More specifically, after recognizing the work, the position and orientation of the hand is calculated based on a taught position and orientation for each work in all symmetry orientations obtained by rotating the work about two N-fold symmetry axes perpendicular to each other, and a position and orientation closest to a preset reference orientation is selected as the final position and orientation of the hand.

The difference from the first embodiment will mainly be explained below, and a description of the same portions as in the first embodiment will be omitted. In this embodiment as well, the appropriate grip position and orientation of the hand is calculated using a grip position and orientation calculation apparatus 1 having the arrangement shown in FIG. 1.

Processing to be performed by the grip position and orientation calculation apparatus 1 to calculate the appropriate grip position and orientation of the hand for a work having 2-fold symmetry with respect to one of two axes perpendicular to each other and N-fold symmetry with respect to the other axis is the same as the processing shown in FIG. 3 except the points to be explained below. The processes of steps S201, S208, S209, and S213 which are different from the first embodiment will be described below.

(Process of Step S201)

A rotation information input unit 11 acquires rotation information as described above. In this embodiment, the rotation information input unit 11 is assumed to acquire rotation information set for the work shown in FIG. 2D using the GUI shown in FIG. 2D. In this case, the rotation information is {xRot, yRot, zRot}={2, 1, 6}. In addition, the rotation information input unit 11 sets axes corresponding to positive integer values other than 1 out of the parameter values for the axes in the rotation information, that is, in this case, the x- and z-axes as rotation axes α and β, respectively. Furthermore, the rotation information input unit 11 sets the parameter value "2" corresponding to the x-axis to a variable N as a rotational symmetry number, and the parameter value "6" corresponding to the z-axis to a variable M as a rotational symmetry number.

(Process of Step S208)

A grip position and orientation decision unit 15 performs initialization to decide a grip orientation of high matching level with the reference orientation of the hand. First, let Vmax be a value representing the maximum matching level of the orientation. Vmax is initialized to a small value (for example, Vmax=−100000). Next, an orientation that maximizes the matching level is defined as a maximum matching orientation. Let Rmax be a 3×3 rotation matrix representing the orientation. Rmax is initialized to the initial orientation of the hand (Rmax=$R_{RH}$). Let Rmax_w be a 3×3 rotation matrix representing the orientation of the work at this time. Rmax_w is initialized to the recognized orientation of the work (Rmax_w=$R_{RW}$). Furthermore, a counter configured to count the number of rotations of the work about the rotation axis is defined as i and initialized to i=0. A counter configured to count the number of rotations of the work about the rotation axis α and a counter configured to count the number of rotations of the work about the rotation axis β are defined as j and k, respectively, and initialized to j=k=0.

(Process of Step S209)

The grip position and orientation decision unit 15 obtains an orientation when the recognized orientation $R_{RW}$ is rotated about the rotation axis α by (360/N×j) degrees and rotated about the rotation axis R by (360/M×k) degrees. The grip position and orientation decision unit 15 obtains an orientation (comparison orientation) $R_{RH\_i}$ having the relationship of the taught orientation with respect to the obtained orientation as a grip orientation used to grip the grip target work having the obtained orientation. The comparison orientation $R_{RH\_i}$ can be calculated by $$R_{RH\_i} = R_{RW} R_k R_j R_{WH}$$

where $R_j$ is a 3×3 rotation matrix that performs (360/N×j) degree rotation about the rotation axis α of the work, and $R_k$ is a 3×3 rotation matrix that performs (360/M×k) degree rotation about the rotation axis β of the work.

(Process of Step S213)

The grip position and orientation decision unit 15 determines whether i<N×M. If i<N×M as the result of determination, the value of the counter i is incremented by one and updated (i←i+1). In addition, if k<M, the value of the counter j is not updated, and the value of the counter k is incremented by one and updated (k←k+1). The process returns to step S209. On the other hand, if k≥M, the value of the counter j is incremented by one and updated (j←j+1). At the same time, the value of the counter k is initialized to 0, and the process returns to step S209.

On the other hand, if i≥N×M, a final grip position and orientation $T_{RH\_max}$ of the hand to grip the grip target work is calculated, using an initial position $t_{RH}$ and the orientation Rmax of the highest matching level out of all symmetry orientations, by $$T_{RH\_max} = \begin{bmatrix} R_{max} & t_{RH} \\ 0^T & 1 \end{bmatrix}$$

The grip position and orientation decision unit 15 outputs the thus calculated final grip position and orientation $T_{RH\_max}$ of the hand to an appropriate output destination, as in the first embodiment. At any rate, when the hand is moved to the final grip position and orientation $T_{RH\_max}$ by controlling the robot arm, the grip target work recognized in the pile can be gripped in an orientation similar to the taught position and orientation.

In this embodiment, the method of calculating the appropriate grip position and orientation of the hand for the work having 2-fold symmetry with respect to one of two axes perpendicular to each other and N-fold symmetry shape with respect to the other axis has been described. More specifically, after recognizing the work, the position and orientation of the hand is calculated based on the taught position and orientation for each work in all symmetry orientations obtained by rotating the work about two N-fold symmetry axes perpendicular to each other, and a position and orientation closest to the preset reference orientation is selected as the final position and orientation of the hand.

Note that for the rotational symmetric shape (e), that is, a rotation member with respect to two axes perpendicular to each other, that is, a sphere, out of the above-described five types of rotational symmetric shapes (a) to (e), no grip difference is generated depending on the orientation. For this reason, the grip position and orientation is decided simply based on the recognized position of a work and a preset orientation.

Fifth Embodiment

Each functional unit included in a grip position and orientation calculation apparatus 1 shown in FIG. 1 can be formed by hardware but may be formed by software (computer program). In this case, an apparatus capable of executing the computer program is applicable to the grip position and orientation calculation apparatus 1 shown in FIG. 1. The hardware arrangement of such an apparatus capable of executing the computer program and applicable to the grip position and orientation calculation apparatus 1 will be described with reference to the block diagram of FIG. 9.

A CPU 901 executes various kinds of processing using computer programs and data stored in a RAM 902 or a ROM 903, thereby controlling the operation of the entire apparatus. The CPU 901 also executes each processing described above as processing to be performed by the grip position and orientation calculation apparatus 1.

The RAM 902 has an area to temporarily store computer programs and data loaded from an external storage device 906, data externally received via an I/F (interface) 907, and the like. The RAM 902 also has a work area used by the CPU 901 to execute various kinds of processing. That is, the RAM 902 can appropriately provide various kinds of areas. The ROM 903 stores the setting data, boot program, and the like of the apparatus.

An operation unit 904 is formed from a mouse, a keyboard, and the like. The user of the apparatus can input various kinds of instructions to the CPU 901 by operating the operation unit 904. For example, operation inputs to the GUIs as shown in FIGS. 2A to 2E are performed via the operation unit 904.

A display unit 905 is formed from a CRT, a liquid crystal screen, or the like and can display a processing result of the CPU 901 as an image, characters, and the like. For example, the GUIs as shown in FIGS. 2A to 2E are displayed on the display unit 905.

The external storage device 906 is a mass information storage device represented by a hard disk drive. The external storage device 906 stores an OS (Operating System), and computer programs and data that cause the CPU 901 to execute each processing described above as processing to be performed by each functional unit shown in FIG. 1. The data also include information described as known information. The computer programs and data stored in the external storage device 906 are appropriately loaded to the RAM 902 under the control of the CPU 901 and become subjects to be processed by the CPU 901.

The I/F 907 is used to connect an external device to the apparatus. For example, the above-described range sensor can be connected to the I/F 907. In this case, the measurement result of the range sensor is acquired in the RAM 902 via the I/F 907, and the position and orientation of a work can be recognized using the measurement result.

All the above-described units are connected to a bus 908. Note that the arrangement of the apparatus applicable to the grip position and orientation calculation apparatus 1 is not limited to that shown in FIG. 9. That is, any arrangement can be employed as long as it can execute the computer programs that cause the CPU 901 to execute each processing described above as processing to be performed by each functional unit shown in FIG. 1. In addition, some of the functions of the functional units shown in FIG. 1 may be formed by hardware or software.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-227537, filed Oct. 31, 2013 which is hereby incorporated by reference herein in its entirety.

What is claimed is:

1. An information processing apparatus for grip position and orientation comprising:
one or more processors; and
a memory storing a program which, when executed by the one or more processors, causes the one or more processors to function as:
a first acquisition unit configured to acquire a taught relative position and orientation between an object that has a shape of rotational symmetry with respect to at least one axis and a gripper as the gripper is gripping the object;
a second acquisition unit configured to acquire a reference orientation of the gripper, which is designated in advance;
a recognition unit configured to recognize an imaged position and orientation of the object from an image including the object;
a derivation unit configured to derive a first candidate orientation of the gripper in which the gripper can grip the recognized object, based on the recognized imaged position and orientation of the object and the taught relative position and orientation;
a comparison unit configured to compare the first candidate orientation of the gripper and the reference orientation; and
a decision unit configured to decide, based on a result of the comparison by the comparison unit, a final grip position and orientation in which the gripper grips the object,
wherein the object is rotationally symmetric when rotated about the axis by 360/N degrees (N is an integer not less than 2),
wherein the derivation unit obtains rotation orientations by rotating the recognized orientation of the object about the axis by each 360/N degrees, and obtains, using the taught relative position and orientation, for each of the obtained rotation orientations, the first candidate orientation of the gripper to grip the object having the rotation orientation, and
wherein the decision unit decides, as the final grip orientation, an orientation closest to the reference orientation out of the obtained first candidate orientations of the gripper.

2. The apparatus according to claim 1, wherein the derivation unit is further configured to derive a second candidate orientation of the gripper in which the gripper can grip the recognized object based on the first candidate orientation and the axis,
wherein the comparison unit compares the reference orientation and each of the first candidate orientation and the second candidate orientation, and
wherein the final grip orientation is decided based on a difference value between the reference orientation and each of the first candidate orientation and the second candidate orientation.

3. The apparatus according to claim 2, wherein the decision unit decides, as the final grip orientation, an orientation corresponding to a minimum difference value out of the first candidate orientation and the second candidate orientation.

4. The apparatus according to claim 1, wherein the object is a rotation member having rotational symmetry with respect to only one axis, and
wherein the decision unit acquires the orientation of the object in the reference orientation as a grippable orientation when a difference value between the first candidate orientation and the reference orientation is larger than a predetermined value, and decides the final grip orientation to grip the object based on the grippable orientation and the recognized imaged orientation of the object.

5. The apparatus according to claim 1, wherein the at least one axis includes a first axis and a second axis perpendicular to the first axis,
wherein the derivation unit obtains a rotation orientation for each of the first axis and the second axis, and obtains, using the taught relative position and orientation, for each of the obtained rotation orientations, the first candidate orientation of the gripper to grip the object having the rotation orientation, and
wherein the decision unit decides, as the final grip orientation, an orientation closest to the reference orientation out of the obtained first candidate orientations of the gripper.

6. The apparatus according to claim 1, wherein the comparison unit derives a difference value between the first candidate orientation and the reference orientation, and when the difference value is larger than a predetermined value, the decision unit updates the reference orientation.

7. The apparatus according to claim 1, wherein information about rotational symmetry of the object is input by a user via an operation unit.

8. The apparatus according to claim 1, further comprising an output unit configured to output the final grip position and orientation decided by the decision unit.

9. The apparatus according to claim 8, further comprising a unit configured to move the gripper to the final grip position and orientation output by the output unit.

10. An information processing method performed by an information processing apparatus for grip position and orientation, comprising:
   acquiring a taught relative position and orientation between an object that has a shape of rotational symmetry with respect to at least one axis and a gripper as the gripper grips is gripping the object;
   acquiring a reference orientation of the gripper, which is designated in advance;
   recognizing an imaged position and orientation of the object from an image including the object;
   deriving a first candidate orientation of the gripper in which the gripper can grip the recognized object based on the recognized imaged position and orientation of the object and the taught relative position and orientation;
   comparing the first candidate orientation of the gripper and the reference orientation; and
   deciding, based on a result of the comparison, a final grip position and orientation in which the gripper grips the object,
   wherein the object is rotationally symmetric when rotated about the axis by 360/N degrees (N is an integer not less than 2),
   wherein the deriving includes obtaining rotation orientations by rotating the recognized orientation of the object about the axis by each 360/N degrees, and obtaining, using the taught relative position and orientation, for each of the obtained rotation orientations, the first candidate orientation of the gripper to grip the object having the rotation orientation, and
   wherein the deciding includes deciding, as the final grip orientation, an orientation closest to the reference orientation out of the obtained first candidate orientations of the gripper.

11. A non-transitory computer-readable storage medium for storing a computer program for grip position and orientation that causes a computer to function as:
   a first acquisition unit configured to acquire a taught relative position and orientation between an object that has a shape of rotational symmetry with respect to at least one axis and a gripper as the gripper is gripping the object;
   a second acquisition unit configured to acquire a reference orientation of the gripper, which is designated in advance;
   a recognition unit configured to recognize an imaged position and orientation of the object from an image including the object;
   a derivation unit configured to derive a first candidate orientation of the gripper in which the gripper can grip the recognized object based on the recognized imaged position and orientation of the object and the taught relative position and orientation;
   a comparison unit configured to compare the first candidate orientation of the gripper and the reference orientation; and
   a decision unit configured to decide, based on a result of the comparison by the comparison unit, a final grip position and orientation in which the gripper grips the object,
   wherein the object is rotationally symmetric when rotated about the axis by 360/N degrees (N is an integer not less than 2),
   wherein the derivation unit obtains rotation orientations by rotating the recognized orientation of the object about the axis by each 360/N degrees, obtains using the taught relative position and orientation, for each of the obtained rotation orientations, the first candidate orientation of the gripper to grip the object having the rotation orientation, and
   wherein the decision unit decides, as the final grip orientation, an orientation closest to the reference orientation out of the obtained first candidate orientations of the gripper.

12. An information processing apparatus for grip position and orientation comprising:
   one or more processors; and
   a memory storing a program which, when executed by the one or more processors, causes the one or more processors to function as:
      a first acquisition unit configured to acquire a taught relative position and orientation between an object that has a shape of rotational symmetry with respect to at least one axis and a gripper, as the gripper is gripping the object;
      a second acquisition unit configured to acquire a reference orientation of the gripper, which is designated in advance;
      a recognition unit configured to recognize an imaged position and orientation of the object from an image including the object;
      a derivation unit configured to derive a first candidate orientation of the gripper in which the gripper can grip the recognized object, based on the recognized imaged position and orientation of the object and the taught relative position and orientation;
      a comparison unit configured to compare the first candidate orientation of the gripper and the reference orientation; and
      a decision unit configured to decide, based on a result of the comparison by the comparison unit, a final grip position and orientation in which the gripper grips the object,
   wherein the object is an object that is rotationally symmetric when rotated about the axis by 360/N degrees (N is an integer not less than 2) and does not change in appearance when rotated about another axis perpendicular to the axis,
   wherein the derivation unit obtains rotation orientations by rotating the recognized orientation of the object for each rotation angle in accordance with the shape of rotational symmetry, and transforms the orientation of the object using a difference amount between the orientation and the rotation orientation corresponding to the grip orientation, and
   wherein the decision unit decides, as the final grip orientation, an orientation of the gripper capable of gripping the object in the transformed orientation.

13. An information processing method performed by an information processing apparatus for grip position and orientation, comprising:
   acquiring a taught relative position and orientation between an object that has a shape of rotational symmetry with respect to at least one axis and a gripper as the gripper is gripping the object;

acquiring a reference orientation of the gripper, which is designated in advance;

recognizing an imaged position and orientation of the object from an image including the object;

deriving a first candidate orientation of the gripper in which the gripper can grip the recognized object, based on the recognized imaged position and orientation of the object and the taught relative position and orientation;

comparing the first candidate orientation of the gripper and the reference orientation; and deciding, based on a result of the comparison, a final grip position and orientation in which the gripper grips the object, wherein the object is an object that is rotationally symmetric when rotated about the axis by 360/N degrees (N is an integer not less than 2) and does not change in appearance when rotated about another axis perpendicular to the axis, wherein the deriving includes obtaining rotation orientations by rotating the recognized orientation of the object for each rotation angle in accordance with the shape of rotational symmetry, and transforming the orientation of the object using a difference amount between the orientation and the rotation orientation corresponding to the grip orientation, and wherein the deciding includes deciding, as the final grip orientation, an orientation of the gripper capable of gripping the object in the transformed orientation.

14. A non-transitory computer-readable storage medium for storing a computer program for grip position and orientation that causes a computer to function as:

a first acquisition unit configured to acquire a taught relative position and orientation between an object that has a shape of rotational symmetry with respect to at least one axis and a gripper as the gripper is gripping the object;

a second acquisition unit configured to acquire a reference orientation of the gripper, which is designated in advance;

a recognition unit configured to recognize an imaged position and orientation of the object from an image including the object;

a derivation unit configured to derive a first candidate orientation of the gripper in which the gripper can grip the recognized object, based on the recognized imaged position and orientation of the object and the taught relative position and orientation;

a comparison unit configured to compare the first candidate orientation of the gripper and the reference orientation; and a decision unit configured to decide, based on a result of the comparison by the comparison unit, a final grip position and orientation in which the gripper grips the object, wherein the object is an object that is rotationally symmetric when rotated about the axis by 360/N degrees (N is an integer not less than 2) and does not change in appearance when rotated about another axis perpendicular to the axis, wherein the derivation unit obtains rotation orientations by rotating the recognized orientation of the object for each rotation angle in accordance with the shape of rotational symmetry, and transforms the orientation of the object using a difference amount between the orientation and the rotation orientation corresponding to the grip orientation, and wherein the decision unit decides, as the final grip orientation, an orientation of the gripper capable of gripping the object in the transformed orientation.

\* \* \* \* \*